United States Patent [19]
Sommer et al.

[11] Patent Number: 6,045,153
[45] Date of Patent: Apr. 4, 2000

[54] INSTRUMENT PANEL COVER ARRANGEMENT AND METHOD OF MAKING

[75] Inventors: James John Sommer, Tipp City; Michael Joseph Vendely, Kettering, both of Ohio

[73] Assignee: General Motors Corporation, Detroit, Mich.

[21] Appl. No.: 08/955,639

[22] Filed: Oct. 23, 1997

[51] Int. Cl.⁷ .................................................. B60R 21/20
[52] U.S. Cl. ........................................ 280/728.3; 280/732
[58] Field of Search ............................. 280/728.3, 731, 280/732

[56] References Cited

U.S. PATENT DOCUMENTS

| | | | |
|---|---|---|---|
| 4,120,516 | 10/1978 | Takamatsu et al. | 280/728.3 |
| 5,222,760 | 6/1993 | Rafferty | 280/728.3 |
| 5,372,379 | 12/1994 | Parker | 280/728.3 |
| 5,447,328 | 9/1995 | Iannazzi et al. | 280/728.3 |
| 5,456,490 | 10/1995 | Carter et al. | 280/728.3 |
| 5,478,107 | 12/1995 | Yamagishi et al. | 280/728.3 |
| 5,501,890 | 3/1996 | Mills | 280/728.3 |
| 5,533,749 | 7/1996 | Leonard et al. | 280/728.3 |
| 5,626,357 | 5/1997 | Leonard et al. | 280/728.3 |
| 5,738,367 | 4/1998 | Zichichi et al. | 280/728.3 |

*Primary Examiner*—Kenneth R. Rice
*Attorney, Agent, or Firm*—Kathryn A. Marra

[57] ABSTRACT

An instrument panel cover arrangement is used for covering an air bag module mounted beneath an instrument panel cover in a vehicle. The arrangement includes a rigid substrate forming the instrument panel cover and a cover plate overlying the substrate in the location of the underlying air bag module and securely attached to the substrate. The cover plate includes outer plate edges. The substrate includes a plurality of cut lines generally defining an air bag deployment opening and extending entirely through the substrate. The cut lines are at a location spaced inwardly from the outer plate edges of the cover plate such that upon air bag deployment, the outer plate edges are separated from the substrate by the force of the deploying air bag. Preferably, the cut lines extend entirely through the substrate to define a major substrate portion and a minor substrate portion. The minor substrate portion entirely underlies and is securely attached to the cover plate and is completely detached from the major substrate portion prior to air bag deployment.

15 Claims, 2 Drawing Sheets

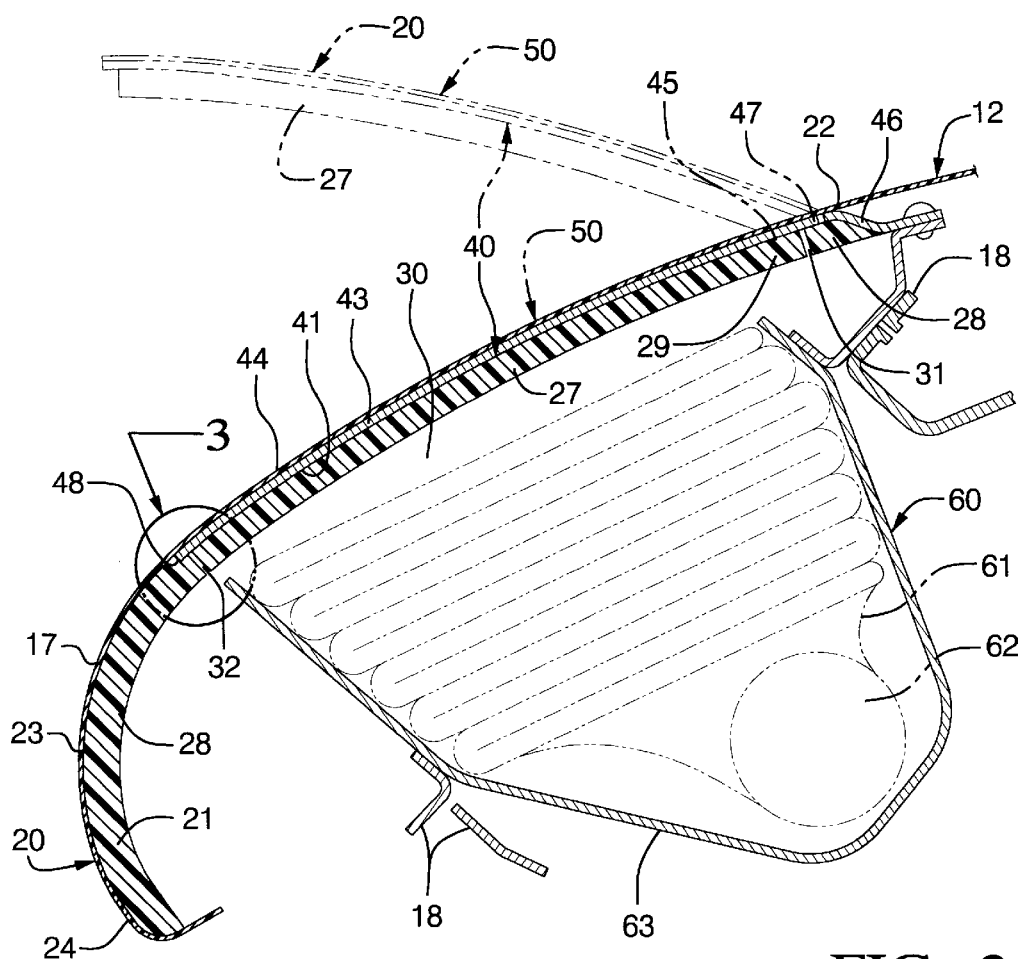
FIG. 2
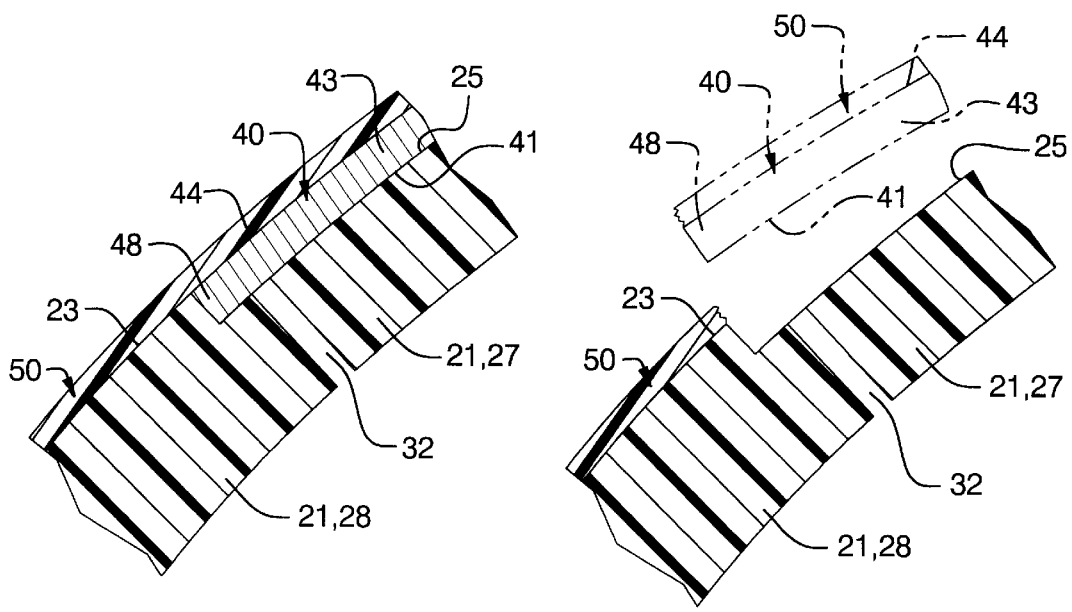
FIG. 3
FIG. 4

INSTRUMENT PANEL COVER ARRANGEMENT AND METHOD OF MAKING

TECHNICAL FIELD

This invention relates to an instrument panel cover including an air bag deployment opening and a method of making such an instrument panel cover.

BACKGROUND OF THE INVENTION

It is well known in motor vehicles to provide an air bag module including an inflatable air bag which deploys into the vehicle interior for protection of one or more vehicle occupants. The air bag module includes an air bag deployable in a generally rearward direction towards the vehicle passenger. It is known to mount the air bag module beneath the instrument panel cover and to provide an air bag deployment opening in the instrument panel cover through which the air bag may deploy. The deployment opening in the instrument panel cover is typically closed by a separate air bag cover door which opens in response to air bag deployment to permit the air bag to deploy into the passenger compartment in a generally rearward direction.

The air bag cover door conceals the air bag module from view and is supported on the instrument panel in a manner which will protect the air bag module and yet open rapidly in the event of air bag deployment. The prior art has provided many such air bag door constructions for closing the deployment opening in the instrument panel cover. For example, the deployment opening is generally provided with a separate cover door having color and texture for generally matching that of the instrument panel front of dash. However, the separate cover door is typically not made of the same material as the instrument panel and some variations in color and texture will occur. Furthermore, the outline of the deployment door opening and the cover is visible on the instrument panel directly in front of the passenger. In addition, weakened seams or tear lines are typically provided which break open upon air bag deployment and may also be visible to the passenger.

Thus, it has also been suggested to provide thinned sections in the instrument panel such that the deployment opening is only partially formed until the inflating air bag forces open the deployment door to provide the deployment opening. The typical instrument panel cover includes an underlying generally rigid substrate made of a molded plastic material and covered by foam and skin. The scoring or cutting may be accomplished by using cutting blades or water jets. However, difficulty arises in controlling the depth of the cuts and assuring that the cuts only extend partially through the substrate. Currently, it is difficult to use lightweight rigid materials for the substrate since the overlying soft layers can be easily damaged during manufacturing when attempting to sever the strong substrate.

SUMMARY OF THE INVENTION

The present invention provides alternatives and advantages over the prior art by providing an instrument panel cover including an air bag deployment opening which is integrally formed by cutting a substrate of the instrument panel entirely therethrough without damaging any outer decorative surface of the instrument panel cover. Advantageously, the air bag deployment opening is hidden from view during normal vehicle usage and enables the provision of a smooth outer surface to the vehicle occupants without visible cut lines on the instrument panel cover. Preferably, a lightweight, rigid material can be used to provide the substrate for the instrument panel cover without the need for a thick overlying foam layer. Also, a method is provided for cutting the substrate of the instrument panel entirely therethrough to enable the use of lightweight rigid materials for the instrument panel substrate, such as glass reinforced urethane, and to provide the deployment opening without damaging the decorative outer layer of the instrument panel cover or providing visible cut lines.

These advantages are accomplished by providing an instrument panel cover arrangement used for covering an air bag module mounted beneath an instrument panel cover in a vehicle. The arrangement includes a rigid substrate forming the instrument panel cover and a cover plate overlying the substrate in the location of the underlying air bag module and securely attached to the substrate. The cover plate includes outer plate edges. The substrate includes a plurality of cut lines generally defining an air bag deployment opening and extending entirely through the substrate. The cut lines are at a location spaced inwardly from the outer plate edges of the cover plate such that upon air bag deployment, the outer plate edges are separated from the substrate by the force of the deploying air bag. Preferably, the cut lines define a major substrate portion and a minor substrate portion. The minor substrate portion entirely underlies and is securely attached to the cover plate and is completely detached from the major substrate portion prior to air bag deployment. The minor substrate portion is carried entirely by the cover plate and the cover plate includes outer plate edges attached to the major substrate portion prior to air bag deployment which break away from the major substrate portion by the force of the deploying air bag. The cover plate preferably includes a hinge portion extending past the minor substrate portion and anchored to the vehicle which enables the cover plate to pivot open about the hinge portion during air bag deployment while remaining attached to the vehicle.

Preferably, the substrate is made of a molded material, such as glass reinforced urethane, and the cover plate is integrally molded to the substrate. Preferably, the cover plate is seated in a recessed portion of the substrate such that the cover plate is flush with the surrounding outer substrate surface.

In accordance with other preferred aspects of the invention, a method is provided for making an instrument panel cover for overlying an air bag module and for providing an air bag deployment opening. The method includes providing a cover plate having outer plate edges; integrally molding the cover plate with the instrument panel substrate; and cutting the substrate entirely therethrough at a location spaced inward from and generally following the outer plate edges of the cover plate to provide cut lines generally defining an air bag deployment opening. Preferably, the cover plate is molded flush with an outer surface of the instrument panel substrate. Also preferably, a continuous layer of outer skin is provided and the substrate is molded to the layer of outer skin for covering the cover plate and the instrument panel substrate to provide a smooth continuous outer surface on the instrument panel cover. Advantageously, the skin can be provided prior to providing the cut lines since the cover plate prevents damage to the layer of outer skin when the cut lines are being made.

A method of making an instrument panel cover including an air bag deployment opening may also include the steps of providing a cover plate having outer plate edges; integrally molding the cover plate with the instrument panel substrate; and cutting the substrate entirely therethrough at a location spaced inward from and generally following the outer plate edges of the cover plate to provide cut lines defining a major substrate portion and a minor substrate portion such that the minor substrate portion entirely underlies the cover plate and is detached from the major substrate portion and such that the outer plate edges remain attached to the major substrate portion prior to air bag deployment. Preferably, the cut lines are formed by water jets.

BRIEF DESCRIPTION OF THE DRAWINGS

The invention will now be described, by way of example, with reference to the accompanying drawings in which:

FIG. 2 is a cross-sectional view taken along line 2—2 of FIG. 1 and showing the opening of a cover plate in phantom lines;

FIG. 3 is an enlarged view of the encircled portion indicated at 3 in FIG. 2; and FIG. 4 is an enlarged view similar to FIG. 3, but showing the formation of the air bag deployment opening with partially deployed cover plate shown in phantom lines.

DESCRIPTION OF THE PREFERRED EMBODIMENT

Figure 1:
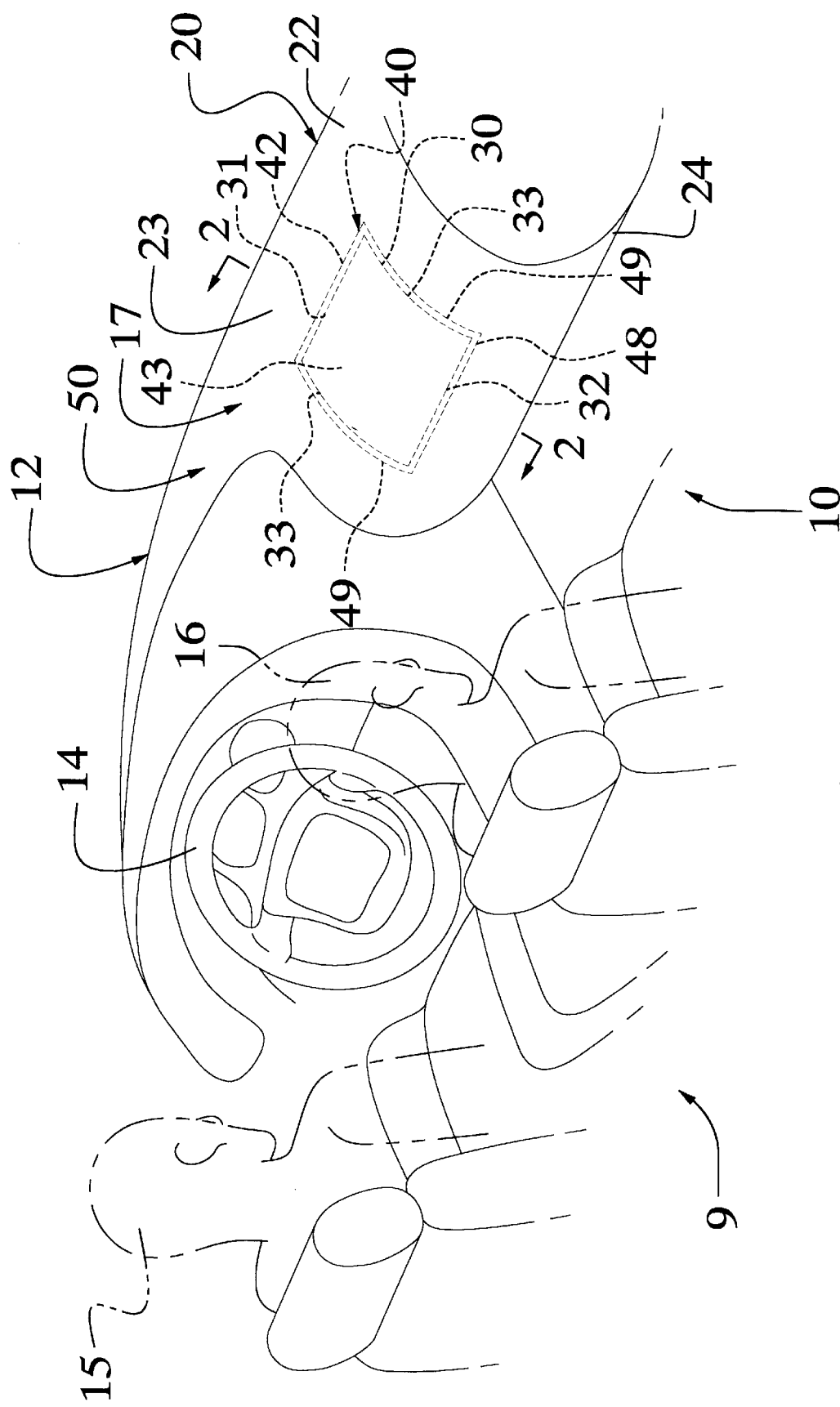
FIG. 1 is a perspective view of a vehicle interior including an instrument panel cover arrangement formed according to the present invention.

Referring to FIG. 1, a vehicle 9 includes a vehicle interior 10 including an instrument panel 12 extending transversely across the vehicle interior 10 between the sides of the vehicle 9. The left side of the instrument panel 12 includes an instrument cluster and steering wheel 14 located in front of a vehicle driver 15. The right side of the instrument panel 12 is positioned forward of a vehicle passenger 16.

The instrument panel 12 includes an instrument panel cover, generally designated as 20. The instrument panel cover 20 extends transversely across and conceals the underlying components of the instrument panel 12, such as HVAC ducts and an air bag module 60. Advantageously, the instrument panel cover 20 is preferably formed as a single continuous structure, which provides a generally smooth and aesthetically pleasing surface including integrally formed curvatures. Both an upper portion 22 and a lower portion 24 of the instrument panel cover 20 are preferably integrally formed as a single continuous structure.

As best shown in FIG. 2, the instrument panel cover 20 includes the instrument panel substrate 21 which preferably is formed of a lightweight, rigid material, such as glass reinforced urethane. The instrument panel substrate 21 is preferably integrally molded as a single component. It will be appreciated that although the instrument panel substrate 21 is preferably glass reinforced urethane, it could be any lightweight, rigid material. Advantageously, a material, such as glass reinforced urethane, can provide a thin and lightweight instrument panel cover 20 which can be formed into many shapes and provides a smooth outer substrate surface 23. Unfortunately, this lightweight, rigid substrate 21 is difficult to cut and is difficult to break open during air bag deployment due to its strength. Thus, the substrate 21 must be cut entirely therethrough prior to air bag deployment to enable the formation of the deployment opening 30, as will be described in detail.

As best shown in FIGS. 1 and 2, the substrate 21 is provided with forward, rearward and side cut lines 31, 32, 33 which divide the substrate 21 into a minor substrate portion 27 and a major substrate portion 28. The minor substrate portion 27 generally overlies the air bag module 60 and pivots open with the cover plate 40 upon air bag deployment as enabled by the cut lines 31, 32, 33, described further hereinafter. Preferably, the minor substrate portion 27 is entirely connected to the cover plate 40 and carried therewith during deployment. The minor substrate portion 27 is preferably entirely separated from the major substrate portion 28 by the forward, rearward, and side cut lines 31, 32, 33, respectively. However, it will be appreciated that the minor substrate portion 27 need not be entirely separated from the major substrate 28 to enable the cover plate 40 to open. For example, the minor substrate portion 27 may be cut on the rearward, right and left sides at the cut lines 32, 33 while the forward edge 29 about which the cover plate 40 pivots open may not necessarily be cut or may alternately be an intermittent or partial cut line 31. However, it is preferred for glass-reinforced urethane that the minor substrate portion 27 be completely separated from the major substrate portion 28 such that lower deployment forces are required to open the cover plate 40 and to prevent uneven hinging of the substrate 21 in the area of the hinge portion 46.

Referring to FIGS. 2–4, the instrument panel cover 20 includes a cover plate 40 which is preferably a generally planar piece which follows the contour of the substrate 21. The cover plate 40 is preferably made of a metallic material, such as steel, which is preferably stronger than the substrate 21 and more difficult to cut. The cover plate 40 is integrally molded into the substrate 21 when the substrate 21 is formed. The substrate 21 preferably includes a recessed portion 25 which is filled by the cover plate 40, such that the cover plate 40 sits flush within the recessed portion 25. The cover plate 40 includes a main central portion 43, and forward, rearward and side outer plate edges 42, 48, 49 extending around its periphery. In addition, the forward edge of the cover plate 40 serves as a hinge portion 46 which is preferably provided by a plurality of apertures 47 in a row along the forward plate edge 42. The hinge portion 46 is suitably secured to underlying vehicle structure 18, such as on the air bag housing 63, to anchor the cover plate 40 during air bag deployment. However, it will also be appreciated that the cover plate 40 need not provide the hinge portion 46 and that a fabric-type tether or a separate metal tether could also be provided.

The cover plate 40 has an inner plate surface 41 which is attached to the recessed portion 25 of the substrate 21. The cover plate 40 also includes an opposite outer plate surface 44 which is flushly aligned and contoured with the surrounding outer substrate surface 23, as shown in FIGS. 2 and 3. Thus, the cover plate 40 which is seated in the recessed portion 25 of the substrate 21 presents a smooth and flush outer panel surface 17 on the instrument panel cover 20 by flush alignment of the outer plate surface 44 and the outer substrate surface 23. The outer plate edges 42, 48, 49 of the cover plate 40 are attached to the major substrate portion 28, preferably by being integrally molded thereto. During air bag deployment, the outer plate edges 42, 48, 49 lift up and break away from the major substrate portion 28 as enabled by the cut lines 31, 32, 33, as described further hereinafter.

An air bag module 60 includes an air bag 61 and an inflator 62 for generating gas to inflate the air bag 61. The air bag 61 and inflator 62 are both preferably stored in the housing 63 which is suitably mounted to underlying vehicle structure 18. The air bag 61 and inflator 62 may be of any conventional construction for deployment upon the sensing of predetermined vehicle conditions.

A decorative outer skin layer 50 preferably covers both the outer plate surface 44 and the outer substrate surface 23 to provide a smooth and continuous outer panel surface 17 on the instrument panel cover 20. Preferably, the outer skin layer 50 is formed of any material which is suitable for an outer skin of an instrument panel cover 20, such as a plastic material including urethane, PVC or TPO. Advantageously, the outer skin layer 50 may be relatively thin as enabled by the flushness of the cover plate 40 with the outer substrate layer 23. However, it will also be appreciated that other outer decorative coverings, such as skin and foam, could also be utilized.

The instrument panel cover 20 is made as follows. The cover plate 40 is integrally molded, preferably as a single continuous piece with the cover plate 40 integrally molded therein and forming the recessed portion 25 during the molding process. The outer plate surface 44 is molded such that it is flushly aligned with and follows the contour of the outer substrate surface 23. In this condition in which the substrate 21 is a continuous piece, it would be extremely difficult to provide a deployment opening in the substrate 21 based only on the force of the deploying air bag 61 or to separate the cover plate 40 from the relatively strong material of the substrate 21. Thus, the substrate 21 is cut along cut lines 31, 32 and 33 to generally define the air bag deployment opening 30 in the substrate 21. The cut lines 31, 32, 33 preferably extend entirely through the substrate 21 and divide the substrate 21 into the minor substrate portion 27 and the major substrate portion 28.

Preferably, the cut lines 31, 32, 33 are made using any suitable method, such as water jets, which are strong enough to cut through the material of the substrate 21, but which are controlled so as to not cut through the material of the cover plate 40. Preferably, the cover plate 40 is more difficult to cut than the substrate 21 such that the cover plate 40 is not cut through while cutting the rigid substrate 21. Due to the presence of the cover plate 40 which serves as a backing plate while cutting the substrate 21, the substrate 21 can be cut entirely therethrough without the presence of any visible cut lines or flexible spots on the instrument panel cover 20 in the location of the air bag deployment opening 30. The cut lines 31, 32, 33 are preferably spaced slightly inward from the outer plate edges 42, 48, 49, preferably by about 0.125 inches (about 3 mm). In this manner, the outer plate edges 42, 48, 49 slightly overhang and remain attached to the major substrate portion 28 prior to air bag deployment. The outer plate edges 42, 48, 49 advantageously rest atop the major substrate portion 28 such that the cover plate 40 cannot be deflected inward on the instrument panel cover 20 during normal vehicle use. The minor substrate portion 27 remains entirely attached to the cover plate 40 prior to and throughout air bag deployment. It will be appreciated that the forward plate edge 42 extends forward past the minor substrate portion 27 and preferably has a larger overhang to provide the hinge portion 46.

It will be appreciated that prior to the formation of the substrate 21 with the cover plate 40, the outer skin layer 50 is preferably formed by a suitable process and placed into the mold. Preferably the substrate 21 is molded directly to the outer skin layer 50 and the cover plate 40 at the same time by a pour-behind type molding process. Thus, the outer skin layer 50 is in place prior to making the cut lines 31, 32, 33. Advantageously, the continuous outer skin layer 50 covers the cover plate 40 and the instrument panel substrate 21 to provide a smooth continuous outer surface 17 on the instrument panel cover 20. Advantageously, the outer skin layer 50 can be provided prior to providing the cut lines 31, 32, 33 since the cover plate 40 prevents damage to the outer skin layer 50 when the cut lines 31, 32, 33 are being made.

Upon the sensing of predetermined vehicle conditions, the inflator 62 generates inflation gas which fills the air bag 61. The air bag 61 inflates and pushes out against an inner surface of the substrate 21, especially in the area of the minor substrate portion 27 aligned above the air bag 61. Referring to FIGS. 2–4, the force of the deploying air bag 61 forces the outer plate edges 42, 48, 49 to lift and break apart from the major substrate portion 28, as enabled by the cut lines 31, 32, 33 which have already separated the substrate 21 into the minor and major substrate portions 27, 28. Advantageously, the plate edges 42, 48, 49 preferably separate and lift cleanly from the major substrate portion 28 during deployment, as shown in FIGS. 2 and 4. The cover plate 40 also easily breaks through the thin outer skin layer 50 as it opens to reveal the deployment opening 30 defined by the cut lines 31, 32, 33. As the air bag 61 deploys, the cover plate 40 pivots open about the hinge portion 46 and the minor substrate portion 27 remains attached to the inner plate surface 41 of the cover plate 40.

It will be appreciated that the instrument panel cover 20, including the substrate 21 and the cover plate 40, provides a lightweight and strong instrument panel cover 20 which can be easily molded and designed to many aesthetically pleasing shapes. Furthermore, the cut lines 31, 32, 33 are not visible and the instrument panel cover 20 includes a smooth outer panel surface 17 as enabled by the flush alignment of the outer plate surface 44 and the outer substrate surface 23. Advantageously, the deployment opening 30 cannot be detected prior to air bag deployment to provide an aesthetically pleasing instrument panel cover 20.

It will be understood that a person skilled in the art may make modifications to the preferred embodiment shown herein within the scope and intent of the claims. Although the preferred embodiment shows the instrument panel cover 20 preferably being made of a single continuous piece, it is only necessary that the instrument panel cover 20 be a single continuous piece in the area of the air bag deployment opening 30 to be utilized.

While the present invention has been described as carried out in a specific embodiments thereof, it is not intended to be limited thereby but is intended to cover the invention broadly within the scope and spirit of the appended claims.

What is claimed is:

1. An instrument panel cover arrangement used for covering an air bag module mounted beneath an instrument panel cover in a vehicle, the arrangement comprising:

a rigid substrate forming the instrument panel cover and having inner and outer surfaces;

a cover plate overlying the substrate in the location of the underlying air bag module and securely attached within a recessed portion of the substrate so as to be flushly aligned with the outer surface of the substrate, the cover plate including outer plate edges; and the substrate including a plurality of cut lines generally defining an air bag deployment opening, the cut lines extending entirely through the substrate at a location spaced inwardly from the outer plate edges of the cover plate.

2. The instrument panel cover arrangement of claim 1 wherein the cut lines define a major substrate portion and a minor substrate portion, and wherein the minor substrate portion entirely underlies and is securely attached to the cover plate and is completely detached from the major substrate portion prior to air bag deployment is carried entirely by the cover plate and wherein the cover plate outer plate edges are attached to the major substrate portion prior to air bag deployment and whereby upon air bag deployment, the outer plate edges of the cover plate break away from the major substrate portion by the force of the deploying air bag and wherein the minor substrate portion is carried open with the cover plate.

3. The instrument panel cover arrangement of claim 2 wherein the cover plate includes a hinge portion extending past the minor substrate portion and anchored to the vehicle and wherein the hinge portion enables the cover plate to pivot open about the hinge portion during air bag deployment while remaining attached to the vehicle.

4. The instrument panel cover arrangement of claim 1 wherein the substrate is made of a molded material and wherein the cover plate is integrally molded to the substrate.

5. The instrument panel cover arrangement of claim 1 wherein the substrate is made of glass reinforced urethane.

6. The instrument panel cover arrangement of claim 1 wherein the cut lines are spaced inward from the outer plate edges of the cover plate by less than one inch.

7. The instrument panel cover arrangement of claim 1 wherein the cut lines are spaced inward form the outer edges of the cover plate by about 3 mm.

8. An instrument panel cover arrangement used for covering an air bag module mounted beneath an instrument panel cover, the arrangement comprising:

a rigid substrate forming the instrument panel cover;

a cover plate overlying the substrate in the location of the underlying air bag module and securely attached within a recessed portion of the substrate such that the cover plate forms a flush surface with the substrate;

the substrate including a plurality of cut lines extending entirely through the substrate and defining a major substrate portion and a minor substrate portion, the minor substrate portion being completely separated from the major substrate portion, the minor substrate portion overlying and aligned with the air bag module; and the cover plate having a main plate portion attached to the minor substrate portion and having outer plate edges attached to the major substrate portion;

whereby upon air bag deployment, the air bag pushes on the substrate and forces the outer plate edges of the cover plate to break away from the major substrate portion such that the minor substrate portion and the cover plate pivot open.

9. The instrument panel cover arrangement of claim 8 wherein the cut lines are spaced inward from the outer plate edges.

10. A method of making an instrument panel cover for overlying an air bag module and providing an air bag deployment opening, the method comprising the steps of:

a) providing a cover plate having outer plate edges;

b) integrally molding the cover plate flush with an outer surface of an instrument panel substrate; and c) cutting the substrate entirely therethrough at a location spaced inward from and generally following the outer plate edges of the cover plate to provide cut lines generally defining an air bag deployment opening.

11. The method of claim 10 further comprising the steps of providing a continuous layer of outer skin and molding the substrate to the layer of outer skin for covering the cover plate and the instrument panel substrate to provide a smooth continuous outer surface on the instrument panel cover with a uniform thickness.

12. The method of claim 10 further comprising the step of providing the cut lines defining a major substrate portion and attaching the outer plate edges of the cover plate to the major substrate portion and providing cut lines defining a minor substrate portion to which a central portion of the cover plate is attached.

13. A method of making an instrument panel cover including an air bag deployment opening, the method comprising the steps of:

a) providing a cover plate having outer plate edges;

b) integrally molding the cover plate flush with an outer surface of an instrument panel substrate; and c) cutting the substrate entirely therethrough at a location spaced inward from and generally following the outer plate edges of the cover plate to provide cut lines defining a major substrate portion and a minor substrate portion such that the minor substrate portion entirely underlies the cover plate and is detached from the major substrate portion and such that the outer plate edges remain attached to the major substrate portion prior to air bag deployment.

14. The method of claim 13 further comprising the step of forming the cut lines by water jets.

15. The method of claim 13 further comprising the steps of providing a continuous layer of outer skin and molding the substrate to the layer of outer skin for covering the cover plate and the instrument panel substrate to provide a smooth continuous outer surface on the instrument panel cover with a uniform thickness.

* * * * *